Figures 1, 2:
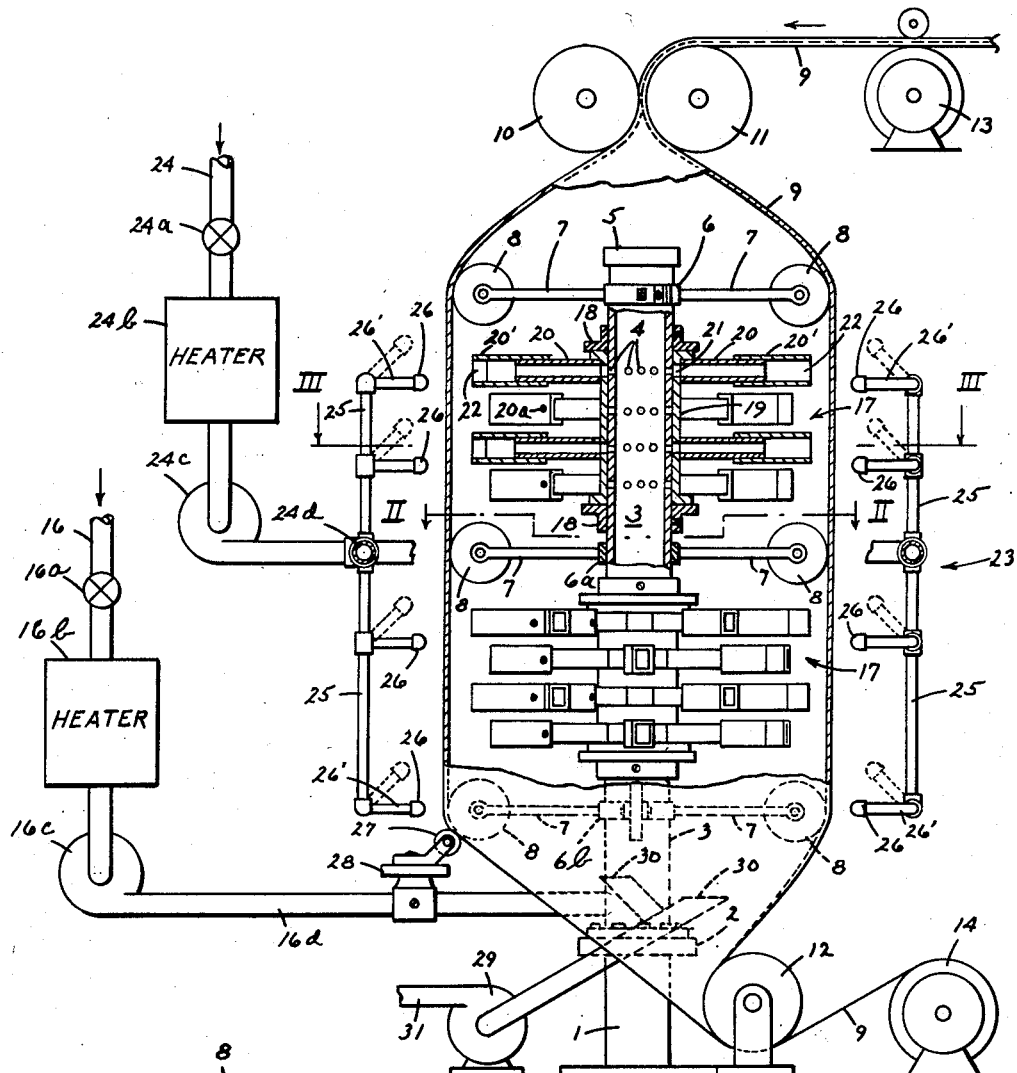

Feb. 19, 1957    R. E. CORNWELL    2,781,589
METHOD AND APPARATUS FOR PROCESSING PLASTIC TUBING
Filed Aug. 31, 1953    2 Sheets-Sheet 1

United States Patent Office 2,781,589
Patented Feb. 19, 1957

2,781,589
METHOD AND APPARATUS FOR PROCESSING PLASTIC TUBING

Richard E. Cornwell, Claymont, Del., assignor to American Viscose Corporation, Philadelphia, Pa., a corporation of Delaware Application August 31, 1953, Serial No. 377,404

9 Claims. (Cl. 34—12)

The present invention relates to a method and apparatus for producing continuous sheets from plastic tubing and more particularly to a novel and improved method and apparatus for drying the tubing.

In manufacturing cellulosic sheet materials such as cellophane it is often found advantageous to extrude the material in tubular form and then cut or slit the tubing following the various processing and drying operations to form a single sheet. With this method, it has been found that the beads which are formed on the sheet edges in ordinary sheet extrusion and forming methods may be eliminated and that the inherent shrinkage of the material may be more effectively controlled. Although various types of drying methods and apparatus have been employed in the past in the preparation of cellulosic sheets from continuously advancing tubing, considerable difficulty has been experienced in efficiently and uniformly drying the tubing.

It is a principal object of the present invention to provide a novel and improved method and apparatus for drying continuously advancing plastic tubing which is subsequently cut or slit to form a single continuous sheet.

Another object is to provide a method for drying continuously advancing cellulosic tubing wherein the drying medium is directed against both the inside and the outside of the tubing.

Still another object is to provide a method for drying continuously advancing cellophane tubing wherein the drying medium is directly and uniformly distributed against the inside of the tubing.

It is also an object of the present invention to provide in apparatus for drying continuously advancing cellulosic tubing, a perforated conduit over and along which the tubing travels and through which drying medium is discharged, and a drying medium distributor for directing the drying medium against the inside of the tubing.

It is another object of the invention to provide in apparatus for drying continuously advancing cellulosic tubing, a plurality of tubing supporting members which support the tube and maintain it in opened and circular form during its travel through the drying area.

With the tubing drying method and apparatus of the present invention, less time is required to dry the tubing than with known drying systems since the medium is more uniformly and more directly distributed against the inside wall surface of the tubing. Another advantage is that the tubing will maintain the desired diameter even if small ruptures appear in the tubing since the tubing is continuously supported during its travel through the drying area. Still another advantage is that the apparatus may be adjusted to produce finished sheets which have definite stretch or shrinkage characteristics.

Figure 3:
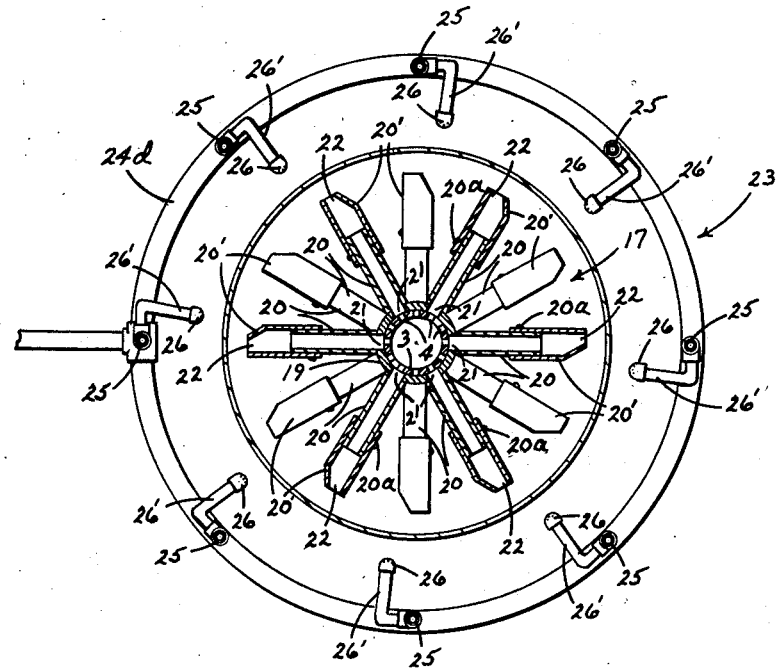

Other objects and advantages of the invention will be apparent from the following description and drawings in which:

Figure 1 is a view, partly sectioned, of a preferred embodiment of the present invention, Figure 2 is a detail, partially in section, of an important feature of my invention as taken along line II—II of Figure 1, and Figure 3 is an enlarged detail, partially in section, of another important feature of my invention as taken along line III—III of Figure 1.

Briefly, the improved method of the present invention for processing a continuously advancing plastic tubing includes passing wet freshly extruded and expanded tubing through a drying zone wherein a drying medium is delivered in confined manner within the bore of the tubing. The medium is then broken up into small separate confined streams which streams travel in confined manner to points immediately adjacent the inside surface of the tube wall from which point they are discharged into the atmosphere of the tubing interior to be uniformly and directly distributed against the inside surface of the tubing wall. The small separated and confined streams are continuously rotated during the treating or drying operation. At the same time, a drying medium is distributed against the outside of the tubing after which the dried tubing is slit to form a single sheet.

In general, the improved apparatus of the present invention for processing continuously advancing plastic tubing includes a perforated conduit and a series of rollers supported by the conduit which engage the inside of the tubing to support and guide the tubing through a drying zone and to maintain the tubing in an expanded condition as it passes therethrough. A drying medium supply system is provided which delivers a drying medium to the inside as well as the outside of the tubing. A rotating drying medium distributor journaled around the conduit uniformly directs and distributes small, separated and confined streams of the drying medium passing through the perforations of the conduit against the inside surface of the tubing wall. A slitter then slits the tubing to form a single sheet.

Referring now to the drawings, a drier assembly constructed in accordance with the present invention is secured to a pedestal 1 by a coupling 2 which in turn supports a conduit 3 having a series of perforations 4, 4 located at spaced intervals around the periphery of the conduit 3. The bore of conduit 3 is sealed axially by a cap 5. A guide roller assembly 6 which carries a plurality of radially extending arms 7, 7 having guide rollers 8, 8 journaled at the outer ends thereof is clamped to the conduit immediately below the cap. A second guide roller assembly 6a is clamped or otherwise adjustably secured to the conduit 3 at about the midpoint thereof and a third guide roller assembly 6b is clamped to the conduit at a point just before the tubing passes out of the drying or treating zone.

The cellophane tubing 9 is fed into the drying zone and over rollers 8, 8 by a pair of feed rollers 10 and 11 which have a nip in line with the vertical center line of conduit 3. The tubing 9 is supplied from a processing roller assembly 13 and passes to take-up roll 14 on which the material is wound after it is dried and slit as will be described hereinafter. During the passage of the tubing over and around rollers 8, 8 it is dried and set in accordance with a predetermined desired diameter.

In the embodiment of my invention shown herein the arms 7, 7 of the drying mechanism are not adjustable radially of the conduit during operation. However, it will be understood that different diameter arms and rollers may be substituted and the axial spacing as well as the number of arms can also be varied to suit any given conditions.

The drying medium such as air is supplied from a source not shown into conduit 16 having a regulating valve 16a which controls the amount of air delivered to the conduit 3 by blower 16c. The air is heated by heater 16b before it passes through conduit 16d to conduit 3. This heated air passes through the conduit 3 and is discharged radially through perforations 4, 4 into a windmill type of distributor 17 having elongated ducts 20, 20 arranged star-shaped around the conduit 3. Each of the ducts 20 is secured to a flanged sleeve 19 journaled on the conduit and retained thereon by means of flanged collars 18, 18. The ducts 20 are fitted over slots 21, 21 milled in the sleeve 19. Hollow extensions 20', 20' are slidably fitted over ducts 20, 20 to provide an adjustable feature for the ducts 20, 20, the purpose of which will be explained hereinafter. The extensions 20', 20' are held in place by set screws 20a, 20a or other suitable retaining means. The air blast directed into the ducts 20, 20 and through duct extensions 20', 20' serves to rotate the entire assembly 17 around the axis of conduit 3. The rotative force is initiated as the air passes through the terminal outer ends of the duct extensions 20', 20' which narrow to form nozzles 22, 22 provide a tangential component for the velocity of air passing therethrough. As seen in Figure 2, the arms 7, 7 are so positioned around the conduit 3 that the guide rolls 8, 8 will maintain the tubing 9 traveling thereover in an opened and substantially circular form. In view of the proximity of the nozzles 22, 22 to the tubing 9, the force of the drying medium issuing from nozzles 22, 22 will further aid in maintaining the tubing in substantially circular form and will prevent creases from forming in the tubing 9 due to the pressing of the shrunk tubing 9 against the guide rolls 8, 8.

The invention also includes means generally indicated by reference numeral 23 (Figures 1 and 3) for directing a drying medium against the outside of the tubing 9. Warm air is supplied from a source not shown into a conduit 24 which has a regulating valve 24a which controls the amount of air delivered to the outside of the tubing 9 by blower 24c. The air passes through the heater and/or humidifier 24b and heater 24d which is concentrically positioned with respect to conduit 3. From the header, the warm air passes through the main line conduits 25 which are connected with header 24d. The drying medium then passes through nozzles 26, 26 and against the exterior of the tubing 9. The nozzles 26, 26 are disposed around the conduit 3 so that the drying medium issuing therefrom will contact the entire exterior of the tubing 9. Each nozzle 26 is mounted on a swivel connection 26' which permits the operator to regulate the proximity of the nozzles with respect to the tubing 9.

Any suitable slitting device such as that indicated at 27 may be used. The rotary slitter 27 is mounted on a support 28 secured to the conduit 16d and extends inwardly toward the tubing 9 to contact the periphery of one of the rollers 8 (see Figure 1). The tubing 9 passing over the roller 8 rotates the slitter 27 and slits the tubing as it advances toward the take-up roll 14.

A suction fan 29 is mounted adjacent the base support 1 to withdraw used drying medium from within the bore of the tubing 9. The medium is withdrawn through outlets 30, 30 and is expelled into the atmosphere through outlet 31.

It will be understood that if the nozzles 22, 22 of duct extensions 20', 20' are designed in accordance with definite specifications and if the pressure of the drying medium passing into the tubing bore is carefully controlled, the velocity of the treating medium, issuing from the nozzles 22, 22, may be increased over the velocity of the medium issuing through the perforations 5, 5 of conduit 3. By increasing the velocity of the drying medium, the solvent in the tubing is evaporated at a faster rate and the tubing 3 is therefore dried in less time.

In using the sheets produced in accordance with the present invention to wrap food articles including cheese, frozen vegetables, meats, etc., it has been found desirable in some instances to use sheets which are capable of a certain amount of shrinkage. In other instances it is desirable to use a sheet wrapper which is capable of a certain amount of stretch. The present invention provides an apparatus which is capable of producing both types of sheets. To produce finished sheet material having substantial shrinkage characteristics, the sheet material must be stretched during the drying stage so that it may contract during or after the wrapping of the article. To stretch the tubing 9 during the drying stage, a series of guide assemblies 6, 6a and 6b are selected and secured around conduit 3 whereby the combined length of any two of the oppositely positioned extension arms 7 of the assemblies 6 6a and 6b in addition to the diameter of the rollers 8, 8 journaled therein and the diameter of conduit 3 is greater than the diameter of the tubing 9 being processed. After the selected assemblies 6, 6a and 6b are affixed to the conduit 3, the end of the wet, stretchable tubing 9 is opened and initially stretched by the operator to lace the tubing 9 over the roll guides 8, 8. The tubing 9 will remain in a stretched condition as it travels through the drying area over the guide rolls 8, 8. Since the tubing 9 is dried in a stretched condition, the resultant sheet will be capable of shrinkage after or during the article wrapping step wherein shrinkage of the wrapper is required.

On the other hand, to produce sheet material which has substantial stretch characteristics, the sheet material must be shrunk during the drying stage. In this situation a series of assemblies 6, 6a and 6b are selected and affixed around conduit 3 whereby the combined length of any two of the oppositely positioned extension arms 7, 7 of the assemblies 6, 6a and 6b in addition to the diameter of rollers 8, 8 journaled thereto and the diameter of conduit 3 is less than the diameter of the tubing being processed. Because of the inherent shrinkage characteristics of the wet tubing 9, it will quickly shrink as it is laced over the roll guides 8, 8 to conform to and contact the guide rolls 8, 8. Since the tubing 9 is dried in this shrunk condition, it will therefore be capable of assuming a stretched condition without inherently weakening the sheet during the article wrapping operation which requires some stretching of the sheet. Further adjustments are possible when processing tubing of different diameters or when imparting stretch or shrinkage characteristics to the tubing 9. As noted above the nozzles 26, 26 are affixed to swivel connections 26', 26'. To process tubings of large diameter the swivel connections 26', 26' are swung from their horizontal position to provide additional space to accommodate the longer arms 7, 7 required for the larger diameter tubes. When drying tubings of smaller diameter, the swivel connections 26', 26' are horizontally positioned to bring them into closer proximity with the tubing 9. Also, as pointed out above the drying medium distributor ducts 20, 20 have adjustable extensions 20', 20 which may be extended or contracted upon conduits 20, 20 to adjust the proximity of the nozzles 22 with respect to the inside surface of the surface of the tubing 9. In view of these adjustable features, it is apparent that the apparatus may be easily adapted to process tubings of a wide variety of diameters.

While preferred embodiments of the invention have been disclosed, the description is intended to be illustrative only and it is to be understood that changes and variations may be made without departing from the spirit and scope of the present invention as defined by the appended claims.

I claim:

1. Apparatus for processing continuously advancing plastic tubing comprising a perforated conduit, a support for supporting the conduit at one end thereof, feeding means for directing the tubing to the unsupported end of the conduit, guides connected with the conduit for opening and guiding the tubing over and along said circuit, means for delivering a drying medium to the perforated conduit, a plurality of treating medium discharge ducts mounted for rotation around the perforated conduit and extending radially therefrom which ducts terminate at points adjacent the path of travel assumed by the tubing passing over the guides whereby the treating medium passing through the perforated conduit and into the ducts is discharged directly against the inside surface of the tubing wall in solvent free condition, means for rotating the discharge ducts whereby the solvent free drying medium uniformly contacts all portions of the inside surface of the tubing wall, drying medium distributors for directing drying medium against the tubing exterior, and a slitter for slitting the tubing.

2. Apparatus for processing continuously advancing plastic tubing comprising a perforated conduit, a support for supporting the conduit at one end thereof, feeding means for directing the tubing to the unsupported end of the conduit, guide rollers mounted on supports secured to the conduit for opening and guiding the tubing over and along said conduit, means for delivering warm air to the perforated conduit, a plurality of warm air discharge ducts mounted for rotation around the perforated conduit and extending radially therefrom which ducts terminate at points adjacent the path of travel assumed by the tubing passing over the guides whereby the warm air passing through the perforated conduit and into the ducts is discharged directly against the inside surface of the tubing wall in solvent free condition, means for rotating the discharge ducts whereby the solvent free warm air uniformly contacts all portions of the inside surface of the tubing wall, means for delivering and directing warm air against the tubing exterior, a slitter for slitting the tubing, and exhaust means for withdrawing solvent contaminated air from within the tubing interior.

3. Apparatus for continuously advancing cellulosic tubing according to claim 2 wherein the means for rotating the radially extending discharge ducts comprises a rotatably mounted sleeve fitted over and around the perforated portion of the conduit, a plurality of slots extending through the sleeve for supporting the discharge ducts, and a plurality of adjustable extensions fitted over the ducts which extensions are shaped to provide a tangential component for the velocity of air passing therethrough whereby the sleeve and ducts supported thereby are rotated.

4. Apparatus for processing continuously advancing cellulosic tubing according to claim 3 wherein the adjustable extensions comprise nozzles at their free ends.

5. Apparatus for processing continuously advancing tubing according to claim 2 wherein the guides comprise a split collar adapted to be fitted around the conduit, a plurality of elongated arms affixed to and extending radially from the collar, and rollers mounted at the free end of each of the arms for engaging the continuously advancing tubing.

6. Apparatus for processing continuously advancing tubing comprising a perforated conduit, a support for supporting the conduit at one end thereof, feeding means for directing the tubing to the unsupported end of the conduit, guide rollers supported by the conduit for opening and guiding the tubing over and along said conduit, means for delivering warm air to the perforated conduit, a plurality of warm air discharge ducts mounted for rotation around the perforated conduit and extending radially therefrom which ducts terminate at points adjacent the path of travel assumed by the tubing passing over the guides whereby the warm air passing through the perforated conduit and into the ducts is discharged directly against the inside surface of the tubing wall in solvent free condition, means for rotating the discharge ducts whereby the solvent free warm air uniformly contacts all portions of the inside surface of the tubing wall, a slitter for slitter for slitting the tubing, and a driven wind up reel for drawing the tubing over the perforated conduit and for collecting the tubing.

7. A method of processing continuously advancing plastic tubing in opened form comprising the steps of conducting the tubing through a treating zone, maintaining the tubing in opened form during its travel through said zone, supplying a treating medium to the treating zone, separating the treating medium supply into a plurality of small confined streams, directing the small confined streams in a confined manner to a plurality of points immediately adjacent the inside surface of the tubing wall, discharging the streams of treating medium into the atmosphere of the tubing interior whereby the treating medium streams strike the inner wall surface of the tubing in solvent-free condition, continuously rotating the plurality of small confined streams to uniformly distribute the treating medium against all portions of the inner wall surface of the tubing, distributing treating medium against the tubing exterior, and slitting the tubing after it leaves the treating zone.

8. A method of drying continuously advancing cellulosic tubing according to claim 7 wherein the treating zone comprises a drying zone, and the treating medium comprises warm air.

9. A method of drying continuously advancing cellulosic tubing according to claim 8 comprising the steps of supplying the warm air under increased pressure conditions, and increasing the velocity of the streams of warm air simultaneously with their discharge into the atmosphere of the tubing interior.

References Cited in the file of this patent

UNITED STATES PATENTS

| 625,169 | Johnston | May 16, 1899 |
| 1,559,556 | Dary | Nov. 3, 1925 |
| 1,647,449 | Kasonof | Nov. 1, 1927 |
| 1,808,879 | Bates | June 9, 1931 |
| 2,192,898 | Dimond | Mar. 12, 1940 |
| 2,365,138 | Mongan | Dec. 12, 1944 |

FOREIGN PATENTS

| 504,491 | Great Britain | Apr. 26, 1939 |